United States Patent
Landrieve et al.

(10) Patent No.: US 6,908,229 B2
(45) Date of Patent: Jun. 21, 2005

(54) INSTRUMENTED ROLLER BEARING, IN PARTICULAR FOR CONTROL WHEEL

(75) Inventors: Franck Landrieve, Fondettes (FR); Johannes Adrianus Maria Duits, Bodegraven (NL)

(73) Assignee: SKF France, Montigny-le-Bretonneux (FR)

(*) Notice: Subject to any disclaimer, the term of this patent is extended or adjusted under 35 U.S.C. 154(b) by 0 days.

(21) Appl. No.: 10/363,213

(22) PCT Filed: Sep. 5, 2001

(86) PCT No.: PCT/FR01/02752
§ 371 (c)(1),
(2), (4) Date: Jul. 22, 2003

(87) PCT Pub. No.: WO02/21006
PCT Pub. Date: Mar. 14, 2002

(65) Prior Publication Data
US 2004/0013334 A1 Jan. 22, 2004

(30) Foreign Application Priority Data

Sep. 6, 2000 (FR) .............................. 00 11357

(51) Int. Cl.$^7$ .............................................. F16C 19/06
(52) U.S. Cl. .................................. 384/448; 324/207.25
(58) Field of Search ................................ 384/448, 446; 324/207.25, 207.15, 173, 174

(56) References Cited

U.S. PATENT DOCUMENTS 5,880,367 A    3/1999  Vaughn
6,456,065 B2 * 9/2002  Hoshi et al. ........... 324/207.25

FOREIGN PATENT DOCUMENTS

| DE | 25 01 521 A | 7/1976 |
| DE | 42 28 719 A | 3/1994 |
| DE | 195 10 717 | 9/1996 |
| DE | 196 25 350 | 1/1998 |
| FR | 2 782 970 | 3/2000 |

* cited by examiner

*Primary Examiner*—Lenard A. Footland
(74) *Attorney, Agent, or Firm*—Young & Thompson

(57) ABSTRACT

An instrumented roller bearing, in particular for an electrical steering wheel (12), comprises an outer component (1) and an inner component (6) whereof one is mobile in rotation relative to the other which is fixed, through at least a row of rolling elements (14) arranged between the components, and elements for detecting (22, 23, 31) the rotating parameters of the rotary component. The bearing further comprises electronic members (34) for processing signals emitted by the detecting elements and electronic elements (35) for controlling at least an actuator electrically connected to the device, advantageously arranged on a printed circuit wafer (33) fixed in rotation.

11 Claims, 1 Drawing Sheet

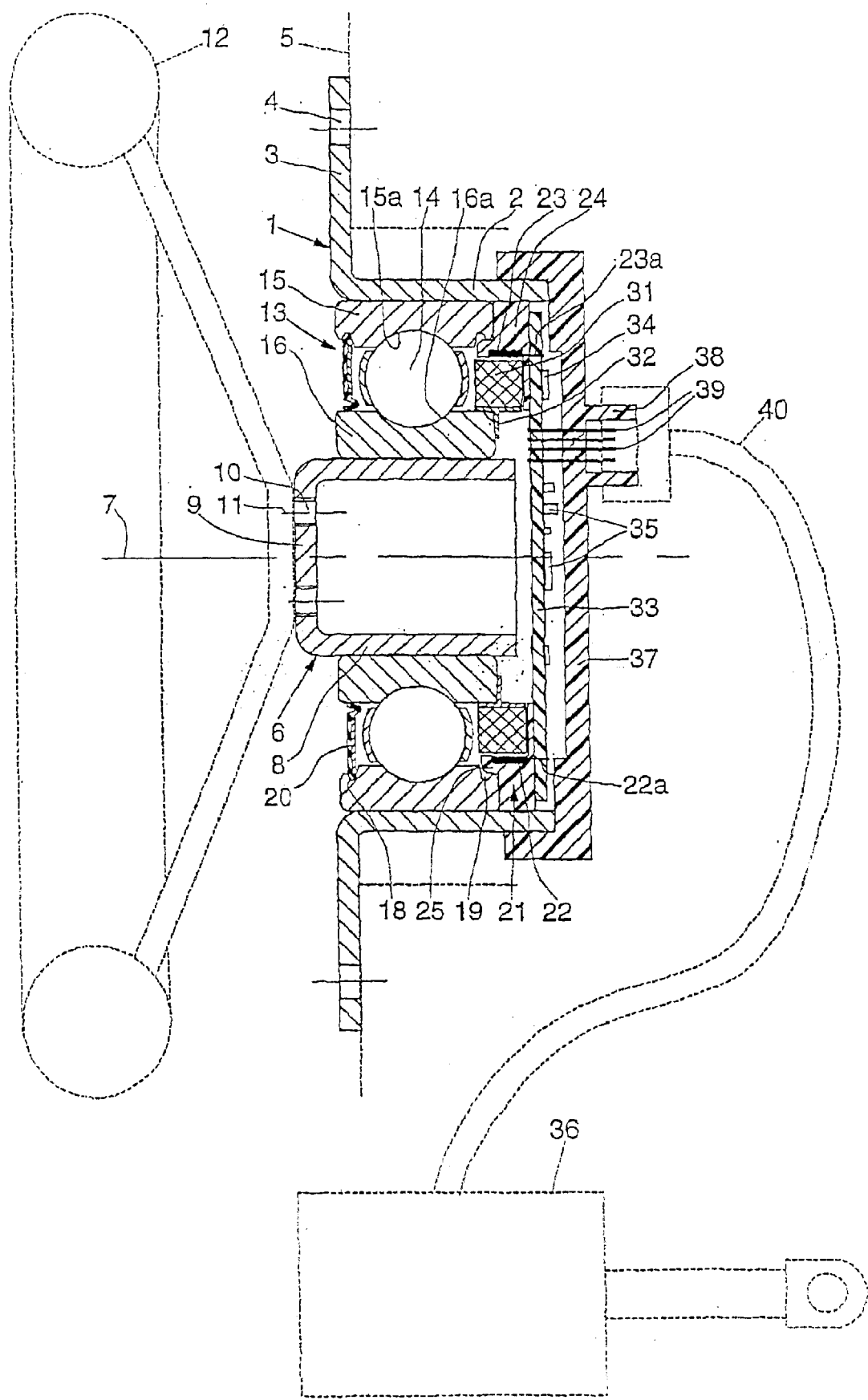

INSTRUMENTED ROLLER BEARING, IN PARTICULAR FOR CONTROL WHEEL

This invention concerns an instrumented roller bearing, that can be used in particular with a control wheel, for example for materials handling machine or an earth moving machine.

The roller bearing is of the type comprising an external element and an internal element, between which there is disposed at least one row of rollers. One of these elements is fixed with respect to a cage, whereas the other can be driven in rotation by the electrical control wheel. The instrumented bearing has a means for detecting the rotation parameters of the rotating element, so that it controls an electrical or electro-hydraulic actuator.

Increasingly more often, electrical steering control is used in materials handling machines, such as fork lift trucks, or certain earth moving machines. The wheel, whose rotational movement is actuated by the driver, is mounted on a fixed support by means of one or two roller bearings, to which a rotation detection system is added, that may or may not be incorporated into the roller bearings. This detection system sends a signal that is representative of the rotation of the wheel (angle, direction and angular speed) to a signal processing system, then to an electronic steering logic system which in turn sends appropriate signals to electrical or electro-hydraulic actuators, that govern the direction of the wheels of the vehicle according to the orders given by the driver.

An example of such a device is illustrated in the French patent application 2 782 970, in which a wheel braking system amongst others has been fitted, in order to generate a resistance torque that makes the vehicle more precise and reliable.

These devices are already known, and although they are satisfactory from a technical point of view, they do have certain disadvantages, in particular as concerns their bulkiness and the complexity involved in mounting them onto the vehicle or machine. In fact, the electronic detection system, like the electronic processing system and the electronic steering system are generally made in the form of separate units, distant from one another and linked by connection systems. Such a scattering of electronic modules has the disadvantage of making them more sensitive to external electromagnetic interference, as the connector cables act as antennae.

The reliability of these known systems is also imperfect, given that the connector cables are exposed to the risks of being damaged of being torn off or sectioned by accident.

The purpose of this invention is to eliminate these difficulties and to create an instrumented roller bearing that is more reliable, easier to mount and more compact than the other devices known until present.

The instrumented roller bearing of the invention, that can be used in particular for a control wheel of a materials handling machine equipped with an electrical steering control system, has an external and an internal element, one of which rotates while the other is fixed, by means of a row of rollers disposed between the said elements. The device also has a means of detection of the rotation parameters of the rotating element. The device of the invention also includes electronic means for processing the signals emitted by the detection means and the electronic steering means by at least one actuator electrically linked to the device.

In this way, the different electronic modules are grouped together inside a particularly compact assembly, which improves reliability by eliminating all external interference on the connections. The device may be made in the form of a modular assembly that is cheap to manufacture and easy to install.

The electronic signal processing means allow the final signal to be processed and adapted to suit the requirements of the application. These means may include in particular a logic BUS type interface to transmission the information detected and to make it reliable, a signal filter to improve the electromagnetic or electrostatic protection that is compatible with the environment of the application and a signal redundancy analysis system, with emission of a fault signal in the case of detection failure.

The electronic steering means allow the final signal to be generated in the form of a voltage and/or a current to servo-control one or more electrical, electronic or electro-hydraulic actuators, actuating for example the mechanism for turning the wheels of a vehicle according to the angular movement of a control wheel, detected by the detection means.

In a preferred embodiment, the electronic signal processing means and the electronic steering means are mounted on a printed circuit board fixed in terms of rotational movement. Simply changing the printed circuit board allows the device to be adapted to another application.

A connector is directly connected to the electronic steering means, and can co-operate with a connector cable linked to the actuator to communicate the steering orders to the latter.

A cover preferably encloses the device on the printed circuit board side. The connector is advantageously fitted directly onto the cover.

In a preferred embodiment, the device has bearing with two bearing bushes, one attached to the rotating element and the other attached to the non-rotating element, with rollers being mounted between the two bushes.

The rotation parameter detection means advantageously includes a sensor attached to the fixed element and an encoder attached to the rotating element. As a variant, to improve the redundancy of the measurement, two sensors may be provided and mounted onto the fixed element at two peripheral positions. The sensors and encoder may also be mounted directly onto the roller bearing bushes. In all cases, each sensor has a connection output directly linked to the electronic signal processing means. This avoids the use of any connector cables.

In a preferred embodiment, the fixed element has a tubular portion and a radial portion equipped with means for attaching the device to a support. The rotating element has a tubular portion and a radial portion equipped with means for attaching a drive element, such as a control wheel.

The invention will be better understood after studying a particular embodiment described by way of example and in no way restrictive, illustrated in the appended figure, which shows an axial cross-sectional view of an embodiment of an instrumented roller bearing according to the invention.

BRIEF DESCRIPTION OF THE DRAWINGS

The FIG. illustrates the bearing with sensor.

In the illustrated embodiment, the instrumented roller bearing has an external element 1 designed to house and attach the roller bearing, of annular shape, featuring a tubular section 2 and a radial portion 3 stretching from one end of the tubular section towards the outside. The radial portion 3 is provided with a number of attachment holes 4 suitable to accept screws to attach it to a fixed cage 5, shown schematically.

The roller bearing has amongst others an internal element 6 centred on the same axis 7 as the external element 1. The internal element 6 has a U section annular shape and has a tubular portion 8, one end of which is enclosed by a radial portion 9. There are a number of holes 10 provided through the tubular portion 9 to accommodate screws shown in 11, for example designed to attach a rotary movement wheel 12, shown schematically in dotted lines.

The external 1 and internal 6 elements are made of xxx s in the example shown.

In the embodiment illustrated a roller bearing 13 is shown between the external 1 and internal 6 elements. The roller bearing 13 has a row of balls 14 disposed between an external bush 16 mounted inside the bore of the tubular portion 2 of the external element 1, and an internal bush 16 mounted on the tubular portion 8 of the internal element 6.

In one variant, it could be provided that rolling elements such as balls 14, needles, etc. be mounted directly in contact with the external 1 and internal 6 elements by means of bearing races provided on the said external and internal elements.

The external bush 15, fitted into the bore of the tubular portion 2 of the external element 1, is provided with a bearing race 15a for the rolling elements 14. The internal bush 16, fitted onto the outside journal of the tubular portion 8 of the internal element 6, is provided with a bearing race 16a for the rolling elements 14. The external bush 15 is among others equipped with two symmetrical grooves 18 and 19 on its bore, on either side of the bearing race 15a. The groove 18 permits a seal 20 to be fitted that is in contact with one of the thrust faces of the internal bush 16. The groove 19 permits a sensor unit to be attached, this assembly is referenced 21.

In the illustrated example, the sensor unit 21 has two detector elements 22, 23, made for example in the form of Hall effect cells, positioned diametrically opposite one another and moulded into a synthetic material forming an annular part 24 of the sensor unit 21. The sensor unit 21 is attached to the front face of the external bush 15 by means of an annular axial portion 25, which co-operates with the groove 19 and is partially housed inside the bore of the non-rotating external bush 15, so that the detection elements 22, 23 may be partially disposed between the two bushes 15 and 16.

As a variant, the sensor unit may also be fixed not ton the external bearing bush but on the tubular portion 2 of the external element 1, for example by a tight press fit into the bore of the tubular portion 2.

The two detection elements 22, 23, each co-operate with a single encoder ring 31, mounted opposite the sensor unit 21 on the external cylindrical surface of the inside rotating bush 16, so that it is driven in rotation by the latter. The encoder ring 31 may be made for example in the form of a multi-polar magnetic ring. The encoder ring 31 is mounted on a support 32 which is partially housed between the bushes 15 and 16. The support 32 is of T section and annular shape, and is attached onto the external cylindrical surface of the rotating bush 26 and is in contact with a face of it. One portion of the encoder ring 31 is thus situated between the bushes 15 and 16 and another portion projects outwards. The majority of the external cylindrical surface of the encoder ring 31 is opposite the two detector elements 22, 23 with a small air gap.

A brake, not shown in the diagram, may also be provided in order to generate a friction torque between the rotating parts and the fixed parts, and therefore improve the precision of the rotational movements of the control wheel. By way of example of such a brake, we can mention the French patent application n° 2 782 970.

The detection of the rotation parameters of the internal rotating bush 16 and consequently of the control wheel is carried out by the encoder ring 31, which moves in front of the sensor unit 21 equipped with its two independent sensors 22, 23. Each of the sensor elements 22, 23 supplies its own information redundantly on the angular displacement of the encoder 31 to the electronic information processing circuit. Each sensor 22, 23, may advantageously include two independent sensors, in order to provide information both on the value and the direction of the angular displacement.

A printed circuit board 33, positioned in a radial plane in the axial continuation of the bearing, is fixed to the sensor unit 21 by any appropriate means such as screws, clips, gluing, ultrasonic welding, etc. The printed circuit board 33 has both electronic signal processing means 34 and electronic means 35 that form a steering logic for an actuator referenced 36, and illustrated on the figure in dotted lines. The actuator 36 may be, for example, an electrical or electro-hydraulic jack used to turn the wheels of a vehicle. The sensors 22, 23 are directly connected to the printed circuit of the board 33 by the short connections 22a, 23a. The connection between the detection means, the electronic signal processing means and the steering logic electronic means is therefore direct, in a very compact space and without the use of external connector cables. This therefore avoids the disadvantages previously mentioned related to the use of such cables.

The device assembly is enclosed on its printed circuit board 33 side by a cover 37, made for example of a synthetic material and fixed by any appropriate means to the outside edge of the tubular portion 2 of the external element 1.

In the embodiment illustrated, the cover 37 has among others a connector 38 whose pins 39 are electrically connected directly to the output of the steering electronic means on the printed circuit board 33. Once again, the connection is practically direct, without connector cables, very compact and avoiding any risk of damage.

The transmission to the actuator 36 of the steering orders resulting from the rotation of the control wheel 12 is made by the cable 410 that is directly connected to the connector 38.

In one variant of the invention, the outside element 1 may include a radial base wall extending towards the inside from the free edge of the tubular portion 2 opposite the radial portion 3, axially enclosing the housing defined radially by the tubular portion 2. Th detection means ad the printed circuit board would then be housed in a space enclosed axially by the said radial wall, and on the opposite side by the roller bearing 13, without any need for an additional cover 37. Of course, connections for the cable 40 and the printed circuit board 33 would be provided.

The device of this invention has a number of advantages. First of all, its great simplicity allows it to be manufactured cheaply. Furthermore, its modularity allows it to be adapted with a same basic roller bearing structure to different applications by simply changing the printed circuit board. It is extremely reliable when handling the bearing, as all of the elements and parts are totally protected. Finally, the device is very easy to install, it is a single unit that comprises the support and attachment means of the control wheel and all electronic means. Once the device is fitted to the vehicle or machine, then the control wheel just has to be fitted onto the internal rotating element 6 and the cable 40 connected to the output connector 38 to make the device work.

The sensor unit 21 and the encoder ring 31 are in direct contact with the bushes 15, 16, which makes the instrumented roller bearing more compact axially.

The printed circuit board 33 is positioned so that it is in contact with the sensor unit 21 and housed with the detection assembly in the tubular portion 2 that also houses the roller bearing 13. This makes possible an assembly that is radially compact, comprising detection means and actuator steering means.

Of course, within the context of this invention, it is possible to provide for the installation of the detector unit directly onto the roller bearing bushes instead of on a separate element, as shown in the example illustrated. Even though, in the example illustrated, two redundant sensors have been used, it is understood that a detector system can be envisaged with a single sensor. Finally, without fundamentally changing the organisation of this invention, it can be envisaged that the external element rotates, while the internal element is fixed.

What is claimed is:

1. Instrumented roller bearing, in particular for a control wheel comprising an external element and an internal element, one of which rotates while the other is fixed, by means of at least one row of rollers disposed between the said elements, and a means of detection of the rotation parameters of the rotating element, and electronic means for processing the signals emitted by the detection means, which comprises electronic means for driving at least one actuator electrically linked to the device, the electronic driving means being provided to transmit the driving orders directly to the actuator.

2. Device of claim 1, wherein the electronic means for processing the signals and the electronic steering means are mounted on a printed circuit board fixed in rotation.

3. Device of claim 1, characterized in that a connector is directly linked to the electronic steering means and can co-operate with a connector cable linked to the actuator.

4. Device of claim 1, which further comprises a cover that encloses the device on the side where the printed circuit board is situated.

5. Device of claim 4, wherein the cover comprises a connector that is directly linked to the electronic steering means and can co-operate with a connector cable linked to the actuator.

6. Device of claim 1, which further comprises two bearing bushes one of which is attached to the rotating element and the other is attached to the non-rotating element, and between them are disposed rolling elements.

7. Device of claim 6, wherein the detection means of the rotation parameters comprise at least one sensor attached to the non- rotating race co-operating with an encoder attached to the rotating bush.

8. Device of claim 7, wherein each sensor comprises a connection output directly linked to the electronic signal processing means.

9. Device of claim 6, wherein the detection mean of the rotation parameters comprise at least one sensor attached to the non- rotating element co-operating with an encoder attached to the rotating element.

10. Device of claim 1, wherein the fixed element comprises a tubular portion and a radial portion equipped with means for attaching the device to a support.

11. Device of claim 1, wherein the rotating element comprises a tubular portion and a radial portion equipped with means for attaching a drive part such as a control wheel.

* * * * *